(12) United States Patent
Lee et al.

(10) Patent No.: US 11,179,804 B2
(45) Date of Patent: Nov. 23, 2021

(54) LASER MACHINING NOZZLE

(71) Applicant: HK CO., LTD., Hwaseong-si (KR)

(72) Inventors: Won Jae Lee, Hwaseong-si (KR); Hak Jae Lee, Gimhae-si (KR); Sung Jun Jo, Seoul (KR); Yang Jae Shin, Hwaseong-si (KR)

(73) Assignee: HK CO., LTD., Hwaseong-si (KR)

( * ) Notice: Subject to any disclaimer, the term of this patent is extended or adjusted under 35 U.S.C. 154(b) by 663 days.

(21) Appl. No.: 16/075,991

(22) PCT Filed: Feb. 20, 2017

(86) PCT No.: PCT/KR2017/001820
§ 371 (c)(1),
(2) Date: Aug. 7, 2018

(87) PCT Pub. No.: WO2017/146424
PCT Pub. Date: Aug. 31, 2017

(65) Prior Publication Data
US 2021/0138583 A1 May 13, 2021

(30) Foreign Application Priority Data

Feb. 25, 2016 (KR) .................. 10-2016-0022454
Jan. 26, 2017 (KR) .................. 10-2017-0012904

(51) Int. Cl.
*B23K 26/14* (2014.01)
*B23K 26/142* (2014.01)
*B23K 26/38* (2014.01)

(52) U.S. Cl.
CPC ........ *B23K 26/1476* (2013.01); *B23K 26/142* (2015.10); *B23K 26/38* (2013.01)

(58) Field of Classification Search
CPC .............. B23K 26/142; B23K 26/1476; B23K 2103/04; B23K 2103/05; B23K 26/0665;
(Continued)

(56) References Cited

U.S. PATENT DOCUMENTS 4,913,405 A * 4/1990 Van Der Have ... B23K 26/0665
219/121.67
5,786,561 A 7/1998 Zefferer et al.
(Continued)

FOREIGN PATENT DOCUMENTS

JP 1981-136295 A 10/1981
JP 2000-107879 A 4/2000
(Continued)

OTHER PUBLICATIONS

International Search Report for PCT/KR2017/001820 dated May 18, 2017 from Korean Intellectual Property Office.

*Primary Examiner* — Dana Ross
*Assistant Examiner* — Adam Michael Eckardt
(74) *Attorney, Agent, or Firm* — Revolution IP, PLLC

(57) ABSTRACT

A laser machining nozzle includes: a nozzle body coupled to a machining head; and a flow path formed through the nozzle body in a longitudinal axis of the nozzle body to allow a machining-assist gas to be injected toward a workpiece therethrough while a laser beam is emitted toward the workpiece, wherein the flow path comprises a first flow path formed in a flow direction of the machining-assist gas and generating a supersonic flow of the machining-assist gas; a second flow path connected to the first flow path in the flow direction of the machining-assist gas and expanding a volume of the machining-assist gas having passed through the first flow path; and a flow path boundary defining a boundary between the first flow path and the second flow path.

9 Claims, 5 Drawing Sheets

(58) Field of Classification Search
CPC .... B23K 26/123; B23K 26/125; B23K 26/14; B23K 26/1435; B23K 26/1436; B23K 26/1437; B23K 26/1462; B23K 26/38; F23D 14/48
See application file for complete search history.

(56) References Cited

U.S. PATENT DOCUMENTS

| | | | |
|---|---|---|---|
| 6,423,928 B1* | 7/2002 | Piwczyk | B23K 26/04 219/121.67 |
| 2005/0067393 A1* | 3/2005 | Olivier | B23K 26/0604 219/121.75 |
| 2011/0210109 A1* | 9/2011 | Szelagowski | B23K 26/1476 219/121.72 |

FOREIGN PATENT DOCUMENTS

| | | | |
|---|---|---|---|
| JP | 2011-041963 A | 3/2011 |
| KR | 10-2011-0090969 A | 8/2011 |
| WO | 2010/049032 A1 | 5/2010 |

* cited by examiner

[FIG. 1]
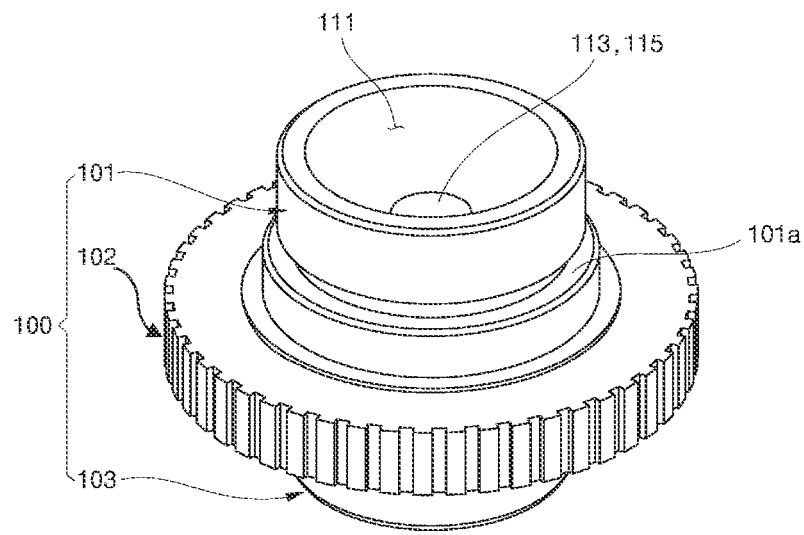
[FIG. 2]
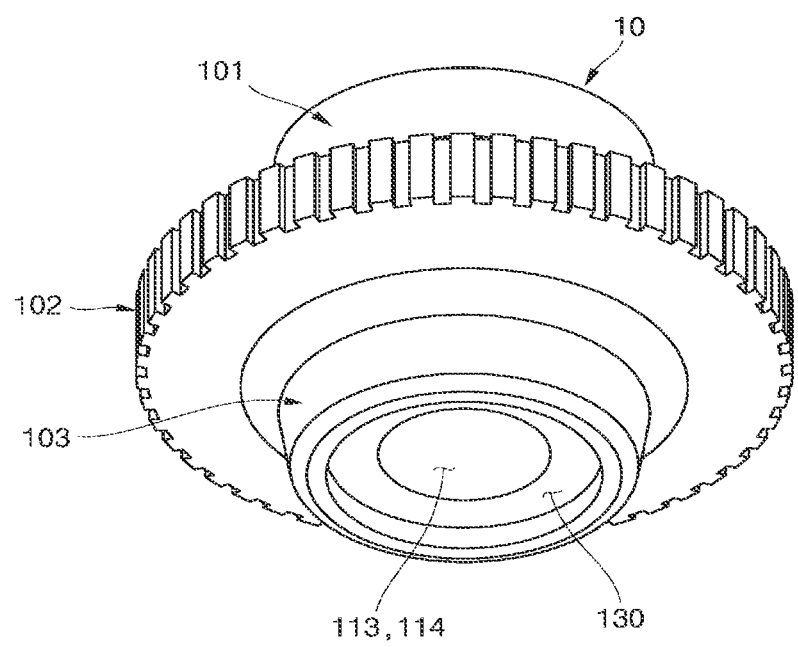

【FIG. 3】
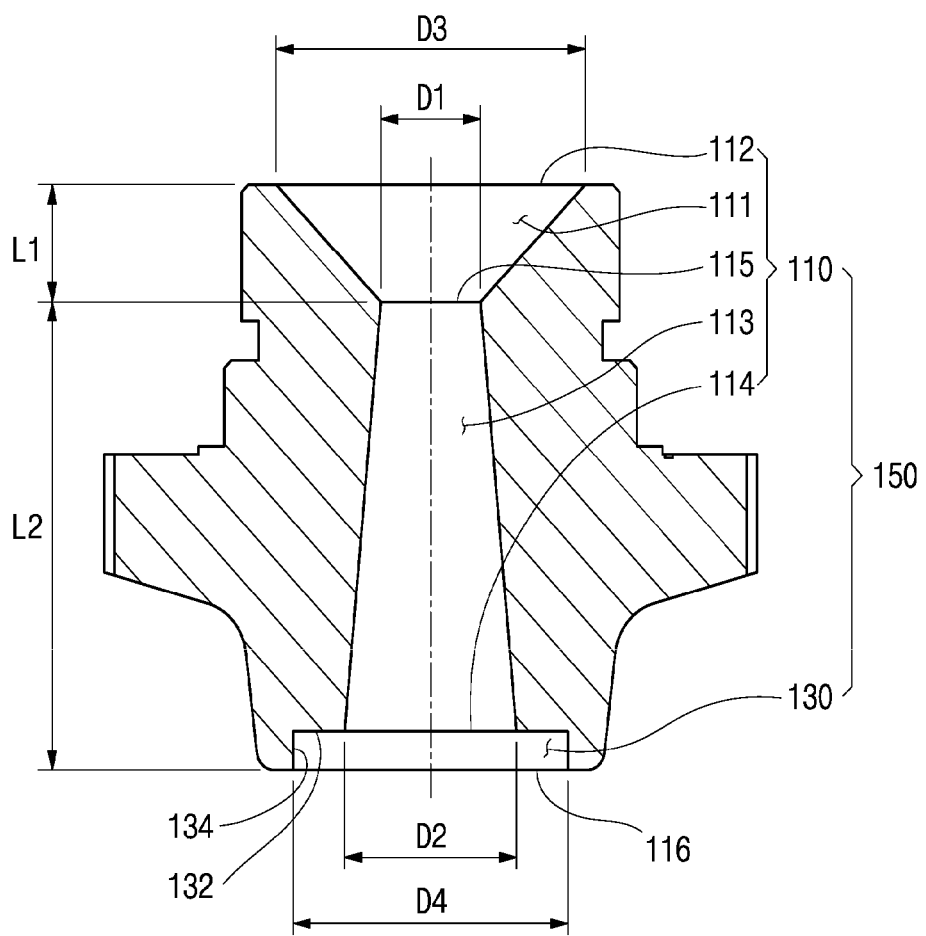

【FIG. 4】
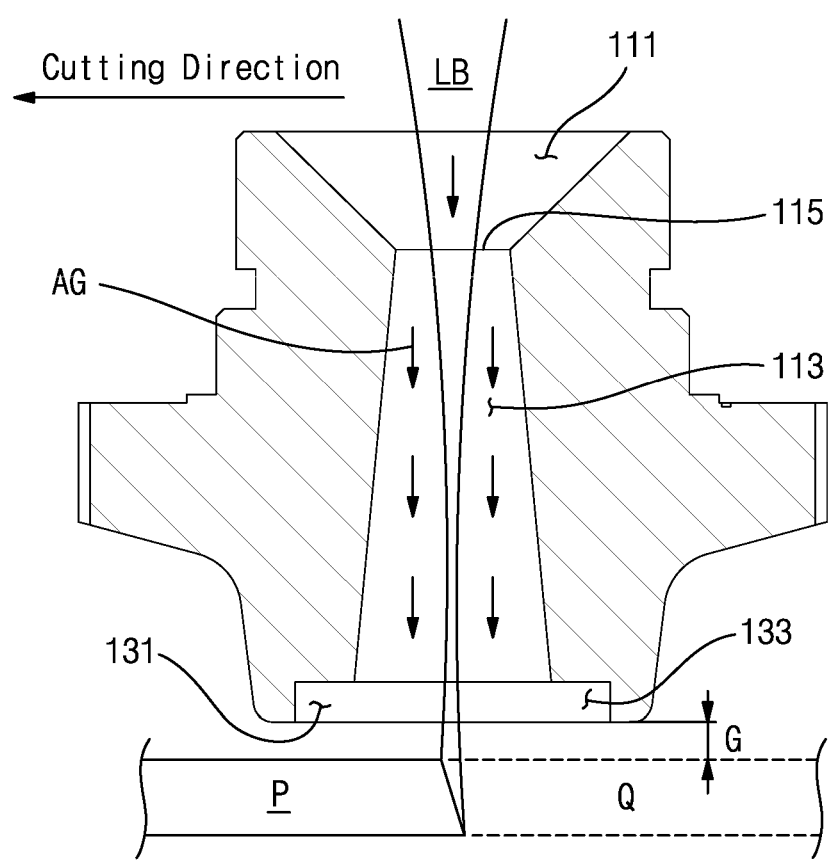

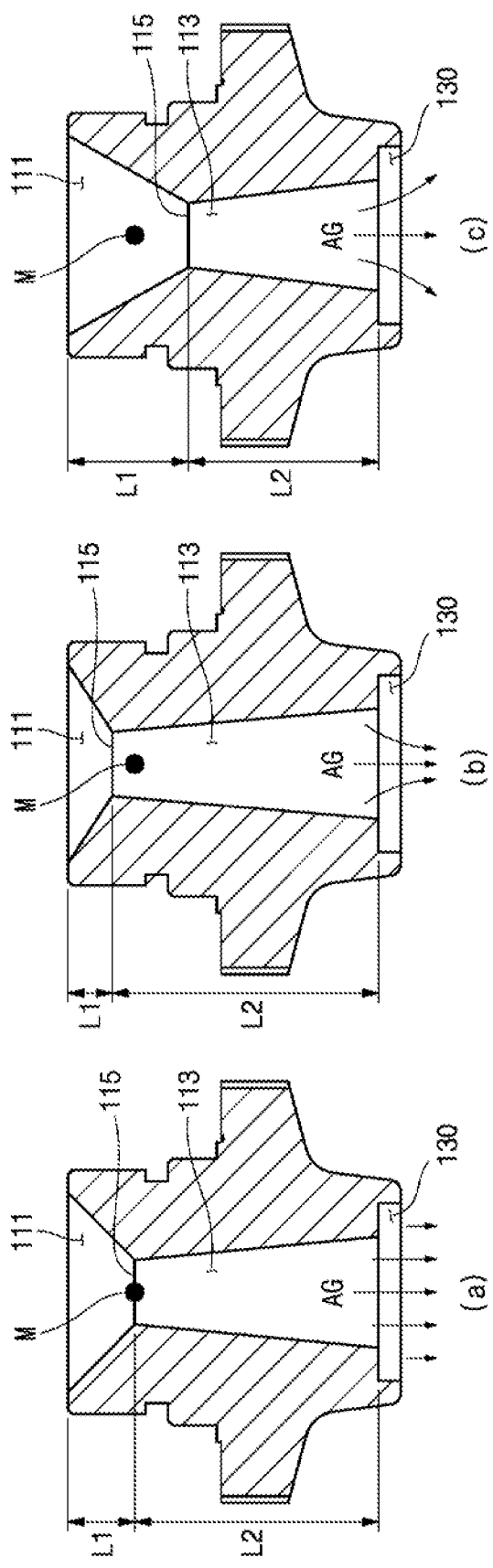
[FIG. 5]

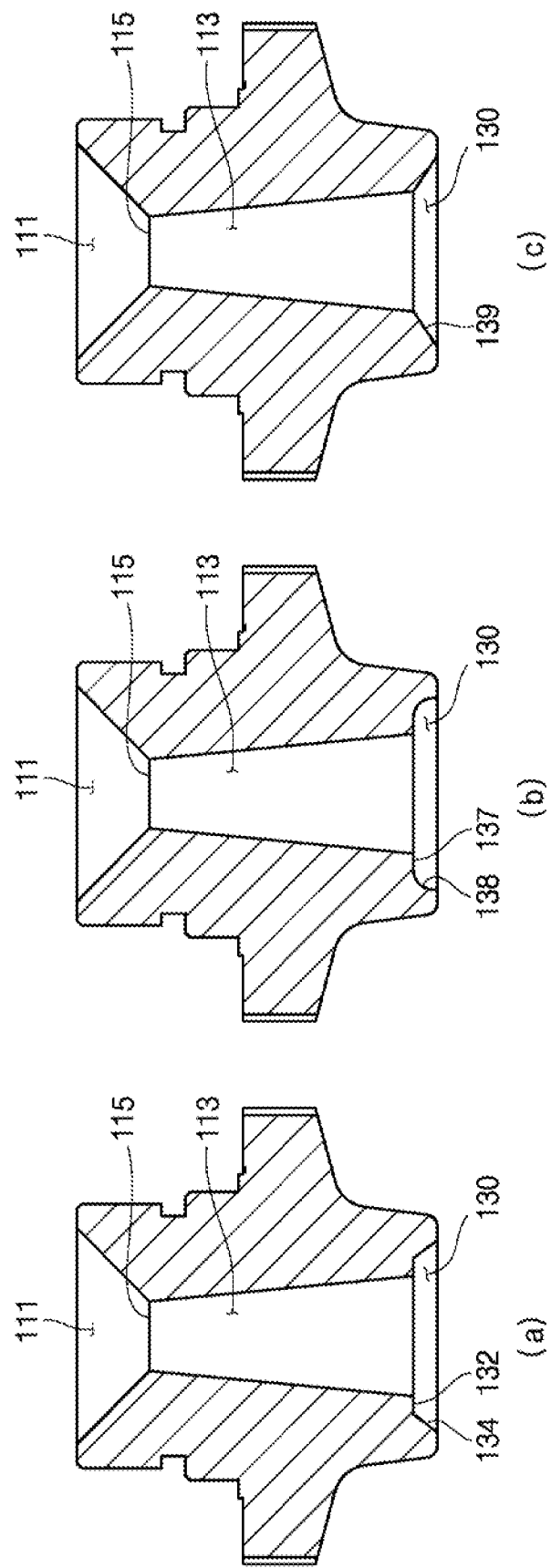
[FIG. 6]

LASER MACHINING NOZZLE

TECHNICAL FIELD

The present invention relates to a laser machining nozzle which can supply a sufficient amount of machining-assist gas to a portion of a workpiece irradiated with a laser beam during machining of the workpiece through irradiation with the laser beam, reduce surface roughness of a machined surface of the workpiece, minimize generation of burrs upon machining of the workpiece, and machine the workpiece while maintaining a preset minimum distance between the laser machining nozzle and the workpiece.

BACKGROUND ART

In general, examples of oscillators used in a laser machining apparatus include a YAG laser having a wavelength of about 1,030 nm, a fiber laser having a wavelength of about 1,070 nm, a disc laser having a wavelength of about 1,060 nm, a semiconductor laser (or direct diode laser: DDL) having a wavelength of about 800 to 900 nm, and a $CO_2$ laser having a wavelength of about 10,600 nm.

The laser machining apparatus machines a workpiece through irradiation with a laser beam collected through oscillation from a laser oscillator and emitted to the workpiece through a nozzle disposed at a lower end of a machining head of the laser machining apparatus, and is broadly used in the art.

On the other hand, a machining-assist gas is injected towards the workpiece through the nozzle upon irradiation with the laser beam. The machining-assist gas serves to improve quality and performance in machining of the workpiece.

Recently, global laser makers have conducted more research and development to improve quality and performance not only in machining of thin plate workpieces but also in machining of thick plate workpieces.

Here, machining quality is affected by various cutting parameters.

In the laser machining apparatus, the nozzle disposed at the lower end of the machining head is one of machining parameters affecting machining quality.

By way of example, a method of cutting a stainless steel or aluminum workpiece is performed using nitrogen as the machining-assist gas. Conventionally, although the diameter of a flow path in the nozzle is determined so as to allow the machining-assist gas using nitrogen to be injected at high pressure, there is no particular consideration as to the shape of the flow path of the nozzle.

Accordingly, a typical laser machining apparatus has various problems such as decrease in workpiece machining rate, increase in surface roughness of a machined surface of a workpiece, significant generation of burrs upon machining of a workpiece, and difficulty in setting and maintenance of a distance between a nozzle and a workpiece. Moreover, it is difficult for the typical laser machining apparatus to cut stainless steel having a thickness of 12 mm to 25 mm.

DISCLOSURE

Technical Problem

The present invention has been conceived to solve problems in the art and it is an object of the present invention to provide a laser machining nozzle, which can supply a sufficient amount of machining-assist gas to a portion of a workpiece irradiated with a laser beam during machining of the workpiece through irradiation with the laser beam, reduce surface roughness of a machined surface of the workpiece, minimize generation of burrs upon machining of the workpiece, and machine the workpiece while maintaining a preset minimum distance between the laser machining nozzle and the workpiece.

Technical Solution

In accordance with one embodiment of the present invention, a laser machining nozzle includes: a nozzle body coupled to a machining head; and a flow path formed through the nozzle body in a longitudinal axis of the nozzle body to allow a machining-assist gas to be injected toward a workpiece therethrough while a laser beam is emitted toward the workpiece, wherein the flow path comprises a first flow path formed in a flow direction of the machining-assist gas and generating a supersonic flow of the machining-assist gas; a second flow path connected to the first flow path in the flow direction of the machining-assist gas and expanding the volume of the machining-assist gas having passed through the first flow path; and a flow path boundary defining a boundary between the first flow path and the second flow path.

The second flow path may include a first extension extending from the flow path boundary in a direction intersecting the flow direction of the machining-assist gas; and a second extension extending from the first extension toward a flow path-terminated portion at which the second flow path is terminated.

The first extension may be substantially perpendicular to the flow direction of the machining-assist gas and the second extension may be substantially parallel to the flow direction of the machining-assist gas.

An obtuse angle may be defined between the first extension and the second extension.

The first extension and the second extension may form an arc shape between the flow path boundary and the flow path-terminated portion.

The second flow path may include a third extension extending from the flow path boundary and inclined such that a cross-sectional area of the flow path increases toward a flow path-terminated portion at which the second flow path is terminated.

The flow path may further include a flow path-terminated portion at which the second flow path is terminated, and a cross-sectional area of the second flow path at the flow path-terminated portion may be larger than a cross-sectional area of the first flow path at the flow path boundary.

The first flow path may include a subsonic flow-generating portion having a cross-sectional area gradually decreasing in the flow direction of the machining-assist gas from a gas inlet through which the machining-assist gas flows into the nozzle body; a supersonic flow-generating portion connected to the subsonic flow-generating portion and having a cross-sectional area gradually increasing from the subsonic flow-generating portion in the flow direction of the machining-assist gas; and a sonic flow boundary defining a boundary between the subsonic flow-generating portion and the supersonic flow-generating portion and allowing the machining-assist gas to be converted from a subsonic flow to a supersonic flow.

The machining-assist gas supplied to the gas inlet may have a pressure of 18 to 22 bar, and a ratio (L1:L2) of a flow path length L1 of the subsonic flow-generating portion to a flow path length L2 of the supersonic flow-generating portion in the flow direction of the machining-assist gas may be 3:11.

When the subsonic flow-generating portion has a diameter D1 at the sonic flow boundary and the supersonic flow-generating portion has a diameter D2 at the flow path boundary, D2/D1 may be greater than 1.7 and less than 2.0.

The nozzle body may include a coupling portion coupled to the machining head; a gripping portion extending from the coupling portion to have a larger cross-sectional area than the coupling portion; and an outlet extending from the gripping portion to have a smaller cross-sectional area than the gripping portion, and the coupling portion, the gripping portion and the outlet may be integrated to form a single body.

Advantageous Effects

The laser machining nozzle according to the present invention can supply a sufficient amount of machining-assist gas to a portion of a workpiece irradiated with a laser beam during machining of the workpiece through irradiation with the laser beam, can reduce surface roughness of a machined surface of the workpiece, can minimize generation of burrs upon machining of the workpiece, and can machine the workpiece while maintaining a preset minimum distance between the laser machining nozzle and the workpiece.

In addition, the laser machining nozzle according to the present invention can stabilize volume expansion of a machining-assist gas in a supersonic flow while improving a machining rate with respect to a workpiece.

Further, the laser machining nozzle according to the present invention can serve as a surge tank for a machining-assist gas at the periphery of the second flow path, at which the second flow path has a larger cross-sectional area than the first flow path, and can increase a discharge rate of a molten material from a machined surface of a workpiece by a laser beam.

Further, the laser machining nozzle according to the present invention can convert the machining-assist gas flowing through a gas inlet from a subsonic flow into a supersonic flow while securing a linear flow of the machining-assist gas converted into the supersonic flow.

Further, the laser machining nozzle according to the present invention can stabilize a supersonic flow of the machining-assist gas while improving linearity of the machining-assist gas discharged through the second flow path by adjusting a relationship between the pressure of the machining-assist gas and the length of the first flow path.

Further, the laser machining nozzle according to the present invention can prevent occurrence of Mach short disk upon flow of the machining-assist gas through the flow path, decrease in momentum of the machining-assist gas through conversion of the flow of the machining-assist gas into sound, and loss of flow energy of the machining-assist gas.

Further, the laser machining nozzle according to the present invention can prevent the machining-assist gas from being converged towards the longitudinal axis of the nozzle body while passing through the second flow path and can prevent the machining-assist gas from being concentrated on a certain portion of a workpiece, when the machining-assist gas generates a supersonic flow.

Further, the laser machining nozzle according to the present invention can prevent the machining-assist gas from diffusing into the second flow path while passing through the second flow path and can prevent loss of the machining-assist gas supplied to a machined surface of a workpiece, when the machining-assist gas generates a supersonic flow.

DESCRIPTION OF DRAWINGS

FIG. 1 is a top perspective view of a laser machining nozzle according to one embodiment of the present invention.

FIG. 2 is a bottom perspective view of a laser machining nozzle according to the embodiment of the present invention.

FIG. 3 is a longitudinal cross-sectional view of a laser machining nozzle according to the embodiment of the present invention.

FIG. 4 is a sectional view of a workpiece upon machining using the laser machining nozzle according to the embodiment of the present invention.

FIG. 5 is sectional views of the laser machining nozzle according to the embodiment of the present invention, illustrating a flow of a machining-assist gas depending upon locations of a sonic flow boundary.

FIG. 6 is sectional views of modifications of a second flow path of the laser machining nozzle according to the embodiment of the present invention.

BEST MODE

Hereinafter, embodiments of the present invention will be described with reference to the accompanying drawings. However, it should be understood that the present invention is not limited to the following embodiments. Herein, detailed description of functions or components apparent to those skilled in the art will be omitted for clarity.

FIG. 1 is a top perspective view of a laser machining nozzle according to one embodiment of the present invention; FIG. 2 is a bottom perspective view of a laser machining nozzle according to the embodiment of the present invention; FIG. 3 is a longitudinal cross-sectional view of a laser machining nozzle according to the embodiment of the present invention; FIG. 4 is a sectional view of a workpiece upon machining using the laser machining nozzle according to the embodiment of the present invention; FIG. 5 is sectional views of the laser machining nozzle according to the embodiment of the present invention, illustrating a flow of a machining-assist gas depending upon locations of a sonic flow boundary; and FIG. 6 is sectional views of modifications of a second flow path of the laser machining nozzle according to the embodiment of the present invention.

Referring to FIG. 1 to FIG. 6, a laser machining nozzle according to one embodiment of the invention includes: a nozzle body 100 coupled to a machining head; and a flow path 250 formed through the nozzle body 100 in a longitudinal axis of the nozzle body 100 to allow a machining-assist gas AG to be injected toward a workpiece therethrough while a laser beam is emitted toward the workpiece. The flow path 150 is formed through the nozzle body in a flow direction of the machining-assist gas AG.

The laser beam is generated by a laser resonator (not shown) or a laser oscillator (not shown) in association with wavelength, maximum beam quality, and the like. Depending upon characteristics of power for generation of laser beams, a $CO_2$ laser, a solid state laser, a fiber laser, a disk or a diode may be used as the laser resonator or the laser oscillator.

The nozzle body 100 may include a coupling portion 101 coupled to the machining head, a gripping portion 102 extending from the coupling portion 101 to have a larger cross-sectional area than the coupling portion 101, and an outlet 103 extending from the gripping portion 102 to have a smaller cross-sectional area than the gripping portion 102.

The coupling portion 101 may be formed with a coupling groove 101a for press-fitting the coupling portion 101 into a fitting portion (not shown) of the machining head. The coupling groove 101a may be formed in a ring shape along a circumferential surface of the coupling portion 101. With this structure, it is possible to guarantee coupling stability between the nozzle body 100 and the fitting portion (not shown).

Although not shown in the drawings, the coupling portion 101 may be formed on an outer circumference thereof with a thread for screw coupling with a screw coupling portion (not shown) of the machining head. With this structure, it is possible to guarantee coupling stability between the nozzle body 100 and the screw coupling portion (not shown).

In addition, the gripping portion 102 may be formed with a fastening roughness. The fastening roughness may protrude or be depressed along a circumferential surface of the gripping portion 102 to provide user convenience.

A laser beam is emitted toward a workpiece through the outlet 103 after passing through the machining head.

Here, the coupling portion 101, the gripping portion 102 and the outlet 103 are integrated to form a single body such that the flow path 150 having a smooth inner surface can be formed to allow a smooth flow of the machining-assist gas AG.

The flow path 150 includes a first flow path 110, a second flow path 130, and a flow path boundary 114, and may further include a flow path-terminated portion 116.

The first flow path 110 is formed in the flow direction of the machining-assist gas AG. The first flow path 110 may generate a supersonic flow of the machining-assist gas AG while the machining-assist gas AG passes therethrough.

The first flow path 110 may include a subsonic flow-generating portion 111, a supersonic flow-generating portion 113, and a sonic flow boundary 115.

The subsonic flow-generating portion 111 has a cross-sectional area gradually decreasing in the flow direction of the machining-assist gas AG from a gas inlet 112 through which the machining-assist gas AG flows into the nozzle body. The subsonic flow-generating portion 111 has a beveled inner surface in the flow direction of the machining-assist gas AG.

The subsonic flow-generating portion 111 may have a wide-top narrow-bottom pyramidal shape in the flow direction of the machining-assist gas AG. By way of example, the subsonic flow-generating portion 111 may have a conical shape having a gradually decreasing cross-sectional area from the gas inlet 112 to the sonic flow boundary 115. The gas inlet 112 is a portion through which the machining-assist gas AG flows into the nozzle body and at which the first flow path 110 starts.

Although the subsonic flow-generating portion 111 is illustrated as having a circular cross-sectional area taken in the perpendicular direction with respect to the flow direction of the machining-assist gas AG in this embodiment, it should be understood that the present invention is not limited thereto. Alternatively, the subsonic flow-generating portion 111 may have an elliptical or polygonal cross-sectional shape.

The supersonic flow-generating portion 113 is connected to the subsonic flow-generating portion 111. The supersonic flow-generating portion 113 has a cross-sectional area gradually increasing from the subsonic flow-generating portion 111 in the flow direction of the machining-assist gas AG. The supersonic flow-generating portion 113 has a beveled inner surface in the flow direction of the machining-assist gas AG.

The supersonic flow-generating portion 113 may have a narrow-top wide-bottom pyramidal shape in the flow direction of the machining-assist gas AG. By way of example, the supersonic flow-generating portion 113 may have a conical shape having a gradually increasing cross-sectional area from the sonic flow boundary 115 to the flow path boundary 114.

Although the supersonic flow-generating portion 113 is illustrated as having a circular cross-sectional area taken in the perpendicular direction with respect to the flow direction of the machining-assist gas AG in this embodiment, it should be understood that the present invention is not limited thereto. Alternatively, the supersonic flow-generating portion 113 may have an elliptical or polygonal cross-sectional shape. Here, the subsonic flow-generating portion 111 may have substantially the same cross-sectional area as the supersonic flow-generating portion 113.

The sonic flow boundary 115 defines a boundary between the subsonic flow-generating portion 111 and the supersonic flow-generating portion 113. The sonic flow boundary 115 converts the machining-assist gas AG from a subsonic flow into a supersonic flow while the machining-assist gas AG passes therethrough.

The sonic flow boundary 115 is a portion at which the subsonic flow-generating portion 111 is terminated and at which the supersonic flow-generating portion 113 starts. The start portion of the subsonic flow-generating portion 111 is coincident with the terminated portion of the supersonic flow-generating portion 113 to form the sonic flow boundary 115.

At the sonic flow boundary 115, the beveled inner surface of the subsonic flow-generating portion 111 meets the beveled inner surface of the supersonic flow-generating portion 113 to form a sharp tip such that conversion of the flow of the machining-assist gas AG can be clearly observed. Accordingly, at the sonic flow boundary 115, an obtuse angle is formed between the beveled inner surface of the subsonic flow-generating portion 111 and the beveled inner surface of the supersonic flow-generating portion 113.

In one embodiment of the invention, the sonic flow boundary 115 may form a virtual plane instead of forming a space in the flow direction of the machining-assist gas AG.

Accordingly, a diameter D1 of the subsonic flow-generating portion 111 at the sonic flow boundary 115 may be smaller than a diameter D3 of the subsonic flow-generating portion 111 at the gas inlet 112. In addition, the diameter D1 of the subsonic flow-generating portion 111 at the sonic flow boundary 115 may be represented by the diameter D1 of the supersonic flow-generating portion 113 at the sonic flow boundary 115. The diameter D1 of the supersonic flow-generating portion 113 at the sonic flow boundary 115 may be smaller than a diameter D2 of the supersonic flow-generating portion 113 at the flow path boundary 114.

The second flow path 130 is connected to the first flow path 110 in the flow direction of the machining-assist gas AG. The second flow path 130 expands the volume of the machining-assist gas AG having passed through the first flow path 110.

The flow path boundary 114 defines a boundary between the first flow path 110 and the second flow path 130. The flow path boundary 114 is a portion at which the first flow path 110 is terminated, a portion at which the supersonic flow-generating portion 113 is terminated, and a portion at which the second flow path 130 starts. The terminated portion of the first flow path 110, the terminated portion of the supersonic flow-generating portion 113, and the starting portion of the second flow path 130 are coincident with one another to form the flow path boundary 114.

The flow path-terminated portion 116 is a discharge outlet of the machining-assist gas AG and corresponds to a portion at which the second flow path 130 is terminated.

A cross-sectional area of the second flow path 130 at the flow path-terminated portion 116 is larger than the cross-sectional area of the first flow path 110 at the flow path boundary 114. In other words, a diameter D2 of the second flow path 130 at the flow path-terminated portion 116 is smaller than a diameter D4 of the second flow path 130 at the flow path-terminated portion 116. Accordingly, the machining-assist gas AG forms an over-expansion flow in the second flow path 130.

In this embodiment, the second flow path 130 includes: a first extension 132 extending from the flow path boundary 114 in a direction intersecting the flow direction of the machining-assist gas AG so as to be enlarged beyond the first flow path 110; and a second extension 134 extending from the first extension 132 toward a distal end of the nozzle body 100 facing a workpiece.

At the flow path boundary 114, the beveled inner surface of the supersonic flow-generating portion 113 in the first flow path 110 meets the inner surface of the second flow path 130 to form a sharp tip such that change in flow of the machining-assist gas AG can be clearly observed.

As shown in FIG. 3, the first extension 132 is substantially perpendicular to the flow direction of the machining-assist gas AG and the second extension 134 is substantially parallel to the flow direction of the machining-assist gas AG, thereby allowing the machining-assist gas AG to be injected in a volume-expanded state toward a machined surface of a workpiece.

Referring to FIG. 4, in machining of a workpiece using the laser machining nozzle according to this embodiment of the invention, the workpiece is irradiated with a laser beam LB emitted through the flow path 150 while the machining-assist gas AG is injected toward the workpiece through the flow path 150, so that the workpiece is machined by the laser beam LB.

In one embodiment, machining of the workpiece may include cutting the workpiece or forming a groove or a hole on the workpiece. Herein, cutting the workpiece will be described as machining of the workpiece. The workpiece may be formed of mild steel, stainless steel, aluminum, copper, brass, and the like.

Herein, the workpiece can be divided into a region Q in which cutting is completed and a region P in which cutting will be performed, with reference to a machined surface of the workpiece.

In one embodiment, nitrogen is used as the machining-assist gas AG and the laser machining nozzle can be effectively used to cut a stainless steel workpiece having a thickness of 12 mm to 25 mm among mild steel, stainless steel, aluminum, copper, and brass workpieces.

Here, since the laser machining nozzle can be controlled to have a gap G of 0.1 mm between the nozzle body 100 and the workpiece, machining of the workpiece can be performed while maintaining a predetermined minimum distance between the laser machining nozzle and the workpiece.

Since the distance of 0.1 mm is maintained between the nozzle body 100 and the workpiece during machining of the workpiece, a portion 131 of the second flow path 130 corresponding to the non-cut region P of the workpiece acts as a surge tank and a portion 133 of the second flow path 130 corresponding to the cutting-completed region Q of the workpiece is further activated to increase the discharge rate of a molten material generated from the machined surface of the workpiece by the laser beam LB.

Specifically, when the machining head is shifted in a cutting direction as indicated by an arrow direction of FIG. 4, a laser beam LB forms a constant cut width on the workpiece while contacting a machined bevel surface of the workpiece. The machined surface and the cut width are well known to those skilled in the art and detailed description thereof will be omitted herein.

Upon machining of the workpiece through irradiation with the laser beam LB, the cut width is a distance from a boundary at which the laser beam LB contacts a front surface of the workpiece to a boundary at which the laser beam LB contact a rear surface of the workpiece in the direction of machining the workpiece. The diameter D4 of the second flow path 130 at the flow path-terminated portion 116 is two or more times of the cut width, thereby allowing stable discharge of a molten material generated on the machined surface of the workpiece while allowing the machining-assist gas AG to be injected to the overall machined surface of the workpiece.

The following description will be given of a relationship between pressure, volume and Mach number of the machining-assist gas AG during flow of the machining-assist gas AG through the first and second flow paths 110, 130.

First, a pressure P1 of the machining-assist gas AG in the subsonic flow-generating portion 111 is higher than a pressure P2 of the machining-assist gas AG in the supersonic flow-generating portion 113 (P1>P2).

Next, a volume V1 of the machining-assist gas AG in the subsonic flow-generating portion 111 is less than a volume V2 of the machining-assist gas AG in the supersonic flow-generating portion 113, and the volume V2 of the machining-assist gas AG in the supersonic flow-generating portion 113 is less than a volume V3 of the machining-assist gas in the second flow path 130 (V1<V2<V3).

In addition, the machining-assist gas AG has a Mach number (MN) of less than 1 (MN<1) in the subsonic flow-generating portion 111, a Mach number (MN) of 1 (MN=1) in the sonic flow boundary 115, a Mach number (MN) of greater than 1 (MN>1) in the supersonic flow-generating portion 113, and a Mach number (MN) of greater than 1 (MN>1) in the second flow path 130.

By the aforementioned relationship between the pressure, volume and Mach number of the machining-assist gas AG, upon machining of the workpiece, for example, upon cutting of a stainless steel workpiece having a thickness of 12 mm, the laser machining nozzle according to the embodiment can increase the discharge rate of a molten material generated from the machined surface of the workpiece, thereby improving the cutting rate of the workpiece.

In this embodiment of the invention, in order to convert the machining-assist gas AG from the subsonic flow into the supersonic flow at the sonic flow boundary 115, it is necessary to satisfy the following conditions for conversion of sonic speed.

First, the pressure of the machining-assist gas AG supplied to the gas inlet 112 is adjusted to be in the range of 18 bar to 22 bar.

Specifically, the pressure of the machining-assist gas AG supplied to the gas inlet 112 may be adjusted to be in the range of 19 bar to 21 bar. More specifically, the pressure of the machining-assist gas AG supplied to the gas inlet 112 may be adjusted substantially to 20 bar.

Secondly, a ratio (L1:L2) of a flow path length L1 of the subsonic flow-generating portion 111 to a flow path length L2 of the supersonic flow-generating portion 113 in the flow direction of the machining-assist gas AG is 3:11.

Thirdly, when the subsonic flow-generating portion 111 has a diameter D1 at the sonic flow boundary 115 and the supersonic flow-generating portion 113 has a diameter D2 at the flow path boundary 114, D2/D1 is greater than 1.7 and less than 2.0.

Specifically, D2/D1 may be greater than 1.72 and less than 1.94. More specifically, the ratio of D1 to D2 (D1:D2) may be adjusted to be in the range of 2.9:5 to 3.6:7. In other words, since the diameter D2 of the supersonic flow-generating portion 113 at the flow path boundary 114 increases when the diameter D1 of the subsonic flow-generating portion 111 at the sonic flow boundary 115 increases, it is possible to convert the machining-assist gas AG from the subsonic flow into the supersonic flow at the sonic flow boundary 115.

Accordingly, as shown in FIG. 5(a), the sonic flow boundary 115 is formed with a flow rate conversion portion M at which the machining-assist gas AG is converted from the subsonic flow into the supersonic flow, whereby the machining-assist gas AG discharged through the second flow path 130 towards the workpiece can generate a supersonic flow having linearity.

With the subsonic flow of the machining-assist gas AG, the injection rate of the machining-assist gas AG increases with decreasing cross-sectional area of the flow path. In this case, disadvantageously, the injection range of the machining-assist gas AG is narrowed corresponding to the cross-sectional area of the flow path. On the contrary, with the supersonic flow of the machining-assist gas AG, since the injection rate of the machining-assist gas AG increases with increasing cross-sectional area of the flow path, the injection range of the machining-assist gas AG can be advantageously enlarged corresponding to the cross-sectional area of the flow path.

In particular, according to this embodiment, the laser machining nozzle can convert the machining-assist gas AG from the subsonic flow into the supersonic flow and can expand the volume of the machining-assist gas AG through the second flow path 130, whereby the machined surface of the workpiece can be sufficiently placed within the injection range of the machining-assist gas AG while increasing the injection rate of the machining-assist gas AG, thereby allowing the machining-assist gas AG to be stably supplied to the machined surface of the workpiece.

However, when the aforementioned conditions for conversion of sonic speed are not satisfied, the flow rate conversion portion M can be formed on the supersonic flow-generating portion 113. By way of example, under the same conditions as those of the flow path of the laser machining nozzle according to the embodiment of the invention, the flow path length L2 of the supersonic flow-generating portion 113 relatively increases when the flow path length L1 of the subsonic flow-generating portion 111 decreases. In this case, as shown in FIG. 5(b), the flow rate conversion portion M can be formed on the supersonic flow-generating portion 113.

In this way, when the flow rate conversion portion M is formed on the supersonic flow-generating portion 113, the injection rate of the machining-assist gas AG is increased, whereas the machining-assist gas AG injected to the workpiece through the second flow path 130 is converged on the longitudinal axis of the nozzle body. As a result, the injection range of the machining-assist gas AG is reduced, thereby causing the machining-assist gas AG not to be delivered to the machined surface of the workpiece.

In addition, when the aforementioned conditions for conversion of sonic speed are not satisfied, the flow rate conversion portion M can be formed on the subsonic flow-generating portion 111. By way of example, under the same conditions as those of the flow path of the laser machining nozzle according to the embodiment of the invention, the flow path length L2 of the supersonic flow-generating portion 113 relatively decreases when the flow path length L1 of the subsonic flow-generating portion 111 increases. In this case, as shown in FIG. 5(c), the flow rate conversion portion M can be formed on the subsonic flow-generating portion 111.

In this way, when the flow rate conversion portion M is formed on the subsonic flow-generating portion 111, the injection rate of the machining-assist gas AG is decreased and the machining-assist gas AG injected to the workpiece through the second flow path 130 diverges with reference to the longitudinal axis of the nozzle body. As a result, the injection range of the machining-assist gas AG is enlarged, thereby causing reduction in injection amount of the machining-assist gas AG and making it difficult for the machining-assist gas AG to efficiently discharge a molten material from the machined surface of the workpiece.

The second flow path 130 of the laser machining nozzle according to the embodiment can be modified into various shapes, as shown in FIG. 6.

First, as shown in FIG. 6(a), the second flow path 130 may include a first extension 132 extending from the flow path boundary 114 in a direction intersecting the flow direction of the machining-assist gas AG so as to be enlarged beyond the first flow path 110; and a second extension 134 extending from the first extension 132 toward a distal end of the nozzle body 100 facing a workpiece. In this embodiment, at the flow path-terminated portion 116 at which the second flow path 130 is terminated, the second flow path 130 has a larger cross-sectional area than the first flow path 110 at the flow path boundary 114.

Here, as shown in FIG. 6(a), an obtuse angle may be formed between the first extension 132 and the second extension 134. When the first extension 132 is substantially perpendicular to the flow direction of the machining-assist gas AG, the second extension 134 may be formed in a beveled structure in which the cross-sectional area of the flow path gradually increases from the first extension 132. In addition, when the second extension 134 is substantially parallel to the flow direction of the machining-assist gas AG, the first extension 132 may be formed in a beveled structure in which the cross-sectional area of the flow path gradually increases from the flow path boundary 114.

Alternatively, as shown in FIG. 6(b), the first extension 137 and the second extension 138 may form an arc shape between the flow path boundary 114 and the flow path-terminated portion 116.

Alternatively, as shown in FIG. 6(c), the second flow path 130 may include a third extension 139 extending from the flow path boundary 114 and inclined such that the cross-sectional area of the flow path increases toward the flow path-terminated portion 116 at which the second flow path 130 is terminated.

The laser machining nozzle according to the present invention can supply a sufficient amount of machining-assist gas to a portion of a workpiece irradiated with a laser beam LB during machining of the workpiece through irradiation with the laser beam LB, can reduce surface roughness of a machined surface of the workpiece, can minimize generation of burrs upon machining of the workpiece, and can machine the workpiece while maintaining a preset minimum distance between the laser machining nozzle and the workpiece.

In addition, the laser machining nozzle according to the present invention can stabilize volume expansion of a machining-assist gas AG in a supersonic flow while improving a machining rate with respect to a workpiece.

Further, the laser machining nozzle according to the present invention can serve as a surge tank for the machining-assist gas AG at the periphery of the second flow path 130, at which the second flow path 130 has a larger cross-sectional area than the first flow path 110, and can increase a discharge rate of a molten material from a machined surface of the workpiece by the laser beam LB.

Further, the laser machining nozzle according to the present invention can convert the machining-assist gas AG flowing through the gas inlet 112 from the subsonic flow into the supersonic flow while securing a linear flow of the machining-assist gas AG converted into the supersonic flow.

Further, the laser machining nozzle according to the present invention can stabilize the supersonic flow of the machining-assist gas AG while improving linearity of the machining-assist gas AG discharged through the second flow path 130 by adjusting a relationship between the pressure of the machining-assist gas AG and the length of the first flow path 110.

Further, the laser machining nozzle according to the present invention can prevent occurrence of Mach short disk upon flow of the machining-assist gas AG through the flow path 150, decrease in momentum of the machining-assist gas AG through conversion of the flow of the machining-assist gas AG into sound, and loss of flow energy of the machining-assist gas AG.

Further, the laser machining nozzle according to the present invention can prevent the machining-assist gas AG from being converged towards the longitudinal axis of the nozzle body while passing through the second flow path 130 and can prevent the machining-assist gas AG from being concentrated on a certain portion of the workpiece, when the machining-assist gas AG generates the supersonic flow.

Further, the laser machining nozzle according to the present invention can prevent the machining-assist gas AG from diffusing into the second flow path 130 while passing through the second flow path 130 and can prevent loss of the machining-assist gas AG supplied to the machined surface of the workpiece, when the machining-assist gas AG generates the supersonic flow.

The laser machining nozzle according to the embodiment of the invention can increase the cutting rate when applied to cutting of a stainless steel workpiece having a thickness of about 12 mm, can reduce surface roughness of a cut surface of a workpiece, and can minimize generation of burrs on the back surface of the workpiece.

The laser machining nozzle according to the embodiment of the invention can be applied not only to cutting of a stainless steel workpiece having a thickness of about 12 mm, but also to cutting of a stainless steel workpiece having a thickness of about 25 mm.

The laser machining nozzle according to the embodiment of the invention may be applied to cutting of a workpiece formed of mild steel, aluminum, copper (Cu), brass, and the like.

Although some embodiments have been described herein with reference to the accompanying drawings, it should be understood that these embodiments are given by way of illustration only and that various modifications, variations and alterations can be made by those skilled in the art without departing from the spirit and scope of the invention.

INDUSTRIAL APPLICABILITY

The present invention relates to a laser machining nozzle and can be particularly applied to industrial fields for machining a workpiece using a laser beam.

The invention claimed is:

1. A laser machining nozzle comprising:
    a nozzle body coupled to a machining head; and
    a flow path formed through the nozzle body in a longitudinal axis of the nozzle body to allow a machining-assist gas to be injected toward a workpiece therethrough while a laser beam is emitted toward the workpiece,
    wherein the flow path comprises:
        a first flow path formed in a flow direction of the machining-assist gas and generating a supersonic flow of the machining-assist gas;
        a second flow path connected to the first flow path in the flow direction of the machining-assist gas and expanding a volume of the machining-assist gas having passed through the first flow path; and
        a flow path boundary defining a boundary between the first flow path and the second flow path,
    wherein the first flow path comprises:
        a subsonic flow-generating portion having a cross-sectional area gradually decreasing in the flow direction of the machining-assist gas from a gas inlet through which the machining-assist gas flows into the nozzle body;
        a supersonic flow-generating portion connected to the subsonic flow-generating portion and having a cross-sectional area gradually increasing from the subsonic flow-generating portion in the flow direction of the machining-assist gas; and
        a sonic flow boundary defining a boundary between the subsonic flow-generating portion and the supersonic flow-generating portion and allowing the machining-assist gas to be converted from a subsonic flow to a supersonic flow,
    wherein a ratio (L1:L2) of a flow path length L1 of the subsonic flow-generating portion to a flow path length L2 of the supersonic flow-generating portion in the flow direction of the machining-assist gas is 3:11 based on the flow direction of the machining-assist gas,
    wherein, when the subsonic flow-generating portion has a diameter D1 at the sonic flow boundary and the supersonic flow-generating portion has a diameter D2 at the flow path boundary, D2/D1 is greater than 1.7 and less than 2.0.

2. The laser machining nozzle according to claim 1, wherein the second flow path comprises:
    a first extension extending from the flow path boundary in a direction intersecting the flow direction of the machining-assist gas; and
    a second extension extending from the first extension toward a flow path-terminated portion at which the second flow path is terminated.

3. The laser machining nozzle according to claim 2, wherein the first extension is perpendicular to the flow direction of the machining-assist gas and the second extension is parallel to the flow direction of the machining-assist gas.

4. The laser machining nozzle according to claim 2, wherein an obtuse angle is defined between the first extension and the second extension.

5. The laser machining nozzle according to claim 2, wherein the first extension and the second extension forms an arc shape between the flow path boundary and the flow path-terminated portion.

6. The laser machining nozzle according to claim 1, wherein the second flow path comprises a third extension extending from the flow path boundary and inclined such that a cross-sectional area of the flow path increases toward a flow path-terminated portion at which the second flow path is terminated.

7. The laser machining nozzle according to claim 1, wherein the flow path further comprises a flow path-terminated portion at which the second flow path is terminated, and a cross-sectional area of the second flow path at the flow path-terminated portion is larger than a cross-sectional area of the first flow path at the flow path boundary.

8. The laser machining nozzle according to claim 1, wherein the machining-assist gas supplied to the gas inlet has a pressure of 18 to 22 bar.

9. The laser machining nozzle according to claim 1, wherein the nozzle body comprises:
a coupling portion coupled to the machining head;
a gripping portion extending from the coupling portion to have a larger cross-sectional area than the coupling portion; and
an outlet extending from the gripping portion to have a smaller cross-sectional area than the gripping portion, the coupling portion, the gripping portion and the outlet being integrated to form a single body.

* * * * *